United States Patent
Chen et al.

(10) Patent No.: US 7,569,829 B2
(45) Date of Patent: Aug. 4, 2009

(54) APPARATUS FOR AUTOMATIC CALIBRATION OF PET/CT SYSTEMS

(75) Inventors: Mu Chen, Knoxville, TN (US); Michael E. Casey, Louisville, TN (US); Jun Bao, Knoxvolle, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 12/034,095

(22) Filed: Feb. 20, 2008

(65) Prior Publication Data
US 2009/0072152 A1   Mar. 19, 2009

Related U.S. Application Data

(60) Provisional application No. 60/973,347, filed on Sep. 18, 2007.

(51) Int. Cl.
*G01T 1/161* (2006.01)
*G01T 1/164* (2006.01)
*G12B 13/00* (2006.01)

(52) U.S. Cl. .............. 250/363.09; 250/252.1; 250/363.03

(58) Field of Classification Search ........... 250/363.09, 250/363.03, 252.1
See application file for complete search history.

(56) References Cited

U.S. PATENT DOCUMENTS

| 7,507,968 B2 * | 3/2009 | Wollenweber et al. . 250/363.07 |
| 2008/0217541 A1 * | 9/2008 | Kim ..................... 250/363.09 |

* cited by examiner

*Primary Examiner*—David P Porta
*Assistant Examiner*—Mindy Vu

(57) ABSTRACT

A calibration system for a combined Positron Emission Tomography (PET)/Computed Tomography scanner system, may have a support structure carrying a rotation motor driving a phantom, wherein the phantom has at least two phantom rods and the rods are positioned such that they are neither parallel nor connected to each other.

22 Claims, 6 Drawing Sheets

300

400

APPARATUS FOR AUTOMATIC CALIBRATION OF PET/CT SYSTEMS

CROSS-REFERENCE TO RELATED APPLICATIONS

This application claims the benefit of U.S. Provisional Application No. 60/973,347 filed on Sep. 18, 2007. entitled "Apparatus for Automatic Calibration of PET/CT Systems"; which is incorporated herein in its entirety.

TECHNICAL FIELD

The present invention concerns the calibration of combined Positron Emission Tomography (PET) scanner and Computed Tomography (CT) systems.

BACKGROUND

In the field of medical image technology, Positron Emission Tomography (PET) or gamma cameras are often combined with Computed Tomography (CT) systems. To conduct a so-called PET scan, a short-lived radioactive tracer isotope, which decays by emitting a positron, is injected usually into the blood circulation of a living subject. After the metabolically active molecule becomes concentrated in tissues of interest, the research subject or patient is placed in the imaging scanner. The molecule most commonly used for this purpose is fluorodeoxyglucose (FDG), a sugar, for which the waiting period is typically an hour.

As the radioisotope undergoes positron emission decay, it emits a positron, the antimatter counterpart of an electron. After traveling up to a few millimeters the positron encounters and annihilates with an electron, producing a pair of gamma photons moving in almost opposite directions. These are detected when they reach one of a plurality of scintillator crystals in the scanning device, creating a burst of light which is detected by photomultiplier tubes (PMT) or silicon avalanche photodiodes (Si APD). The technique depends on simultaneous or coincident detection of the pair of photons along respective lines of response (LOR). Due to the nature of the system, a relative complex normalization, time alignment and quality check needs to be performed on the PET scanner part. Moreover, as the CT and PET scanners are very different systems, and produces different kind of images, the system needs to be calibrated with respect to the PET/CT gantry offset. A variety of different calibration methods for each system is known.

Conventional PET/CT devices use specific phantoms to perform the PET/CT gantry offset task, another phantom source to perform the PET setup task, and yet another phantom source to perform the PET time alignment, normalization, and quality check tasks. These tasks need to be performed very often, sometimes daily, especially for mobile PET/CT systems, to maintain a good image quality.

In order to perform the tasks mentioned above, each time a technician or a service personal has to put a different phantom on and off the scanner. This process is time consuming. Moreover, technicians are unnecessarily exposed to the radiation dose of the different phantoms. Also, handling these phantoms can be difficult as some of these phantoms weight around 10 lb or more.

Hence, there exists a need for an apparatus and method for performing PET/CT gantry offset, PET setup, time alignment, normalization, and quality check with a single device. In addition there is a need for an automated procedure to perform such calibrations.

SUMMARY

According to one embodiment, a calibration system for a combined Positron Emission Tomography (PET)/Computed Tomography scanner system, may comprise a support structure carrying a rotation motor driving a phantom, wherein the phantom comprises at least two phantom rods, wherein the rods are positioned such that they are neither parallel nor connected to each other.

According to another embodiment, a combined Positron Emission Tomography (PET)/Computed Tomography scanner system, may comprise: a vertically movable patient table comprising a rail along which a support structure can be moved, wherein the support structure carries a rotation motor driving a phantom, wherein the phantom comprises at least two phantom rods, wherein the rods are positioned such that they are neither parallel nor connected to each other.

According to further embodiments, the calibration system may further comprise a moving mechanism operable to move the rods from a first position in which the rods are positioned neither parallel nor connected to each other to a second position different from the first position. According to a further embodiment, the moving mechanism can be operated manually. According to a further embodiment, the moving mechanism can be driven by at least one positioning motor. According to a further embodiment, the support structure can be movably mounted on a patient table of the combined Positron Emission Tomography (PET)/Computed Tomography scanner system. According to a further embodiment, the patient table may comprise a rail attached to the bottom of the table along which the support structure can be moved. According to a further embodiment, the patient table can be cantilevered from a lift unit which comprises a storage compartment for receiving the support structure when moved into a storage position. According to a further embodiment, the storage compartment can be shielded. According to a further embodiment, the phantom may be removable from the rotation motor. According to a further embodiment, the phantom may comprise two rods comprising Ge-68.

According to another embodiment, a method for calibrating a combined Positron Emission Tomography (PET)/Computed Tomography scanner system, may comprise the steps of: providing a single phantom for performing a plurality of calibration tasks; wherein the single phantom is moved into a gantry of the combined Positron Emission Tomography (PET), Computed Tomography scanner system and held into a static position during at least one of the plurality of calibration tasks; wherein the single phantom is rotated along a horizontal axis within said gantry during at least another one of the plurality of calibration tasks; and wherein the phantom comprises two rods that are positioned for at least one of the plurality of calibration tasks such that they are neither parallel nor connected to each other.

According to a further embodiment, the plurality of calibration tasks may comprise a gantry offset determination task, a gantry setup task, a time alignment task, a normalization task, and a quality check task. According to a further embodiment, the phantom can be rotated during the gantry setup, the time alignment task, the normalization task, and the quality check task. According to a further embodiment, the rods can be moved from a first position into a second position between two sequential calibrations tasks. According to a further embodiment, in the first position the two rods may be neither parallel nor connected to each other and in the second position the two rods may be in parallel. According to a further embodiment, the method may further comprise the step of moving the rods manually from a first position into a second position. According to a further embodiment, the method may further comprise the step of moving the rods automatically from a first position into a second position.

BRIEF DESCRIPTION OF THE DRAWINGS

A more complete understanding of the present disclosure thereof may be acquired by referring to the following description taken in conjunction with the accompanying drawings wherein.

Figure 1:
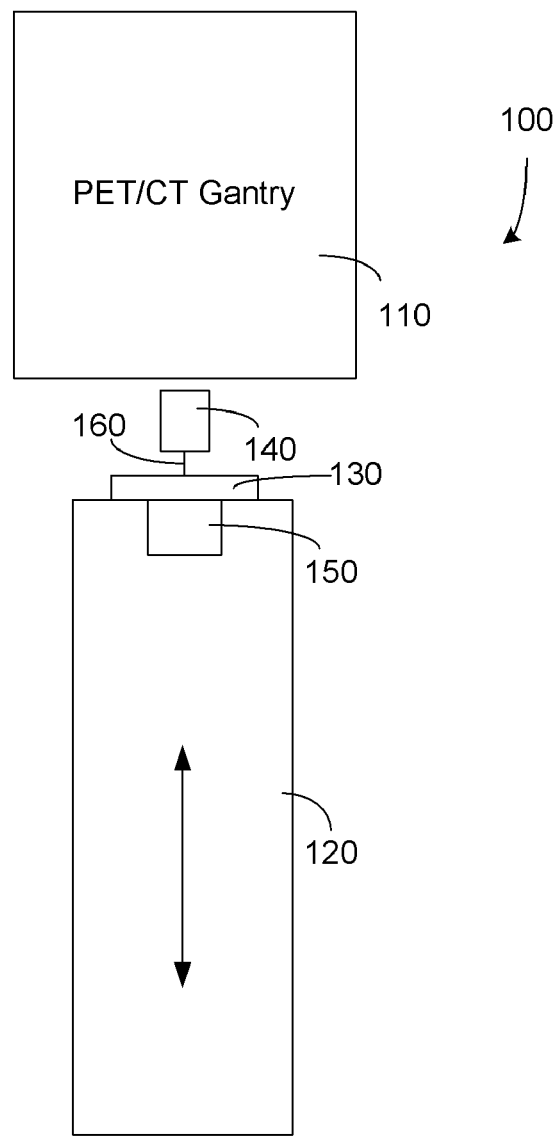
FIG. 1 shows a top view of a PET/CT gantry and a movable patient table.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to an embodiment, the cross-rod phantom can be used to perform not only the gantry offset task but all other necessary calibration in a combined PET/CT system. To this end, the cross-rod phantom comprises, for example, of two rod Ge-68 sources arranged in a housing. A minimal distance line between these two rods can be used in the gantry offset task. The calibration phantom according to various embodiments can be mounted at the end of the patient table and, thus, these two rods can be moved in the center region of the field of view (FOV) and provide relatively uniform singles rate across all the detectors. Hence, the phantom can also be used in the detector setup task. According to an embodiment, the phantom can be rotated. By rotating the phantom and thereby the two rods, the phantom provides a uniform "shell" source, which can also be used in the time alignment task, normalization task, and quality check task of the PET scanner.

FIG. 1 shows a top view of a system 100 with an exemplary PET/CT gantry 110 into which a cantilevered patient table 120 can be moved. At the distal end of the patient table 120, a phantom device can be mounted. The phantom device comprises a mounting device 130 which supports the phantom 140 at its free end. The phantom 140 can be rotated around an axis/shaft 160 through rotation motor 150.

Figure 2:
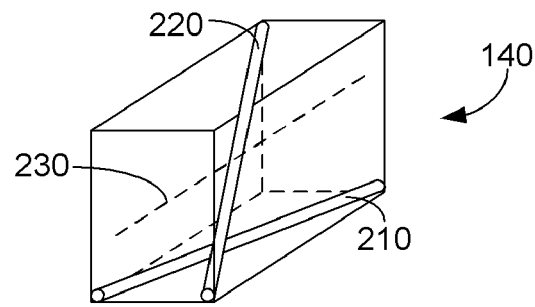
FIG. 2 shows an exemplary cross rod phantom.

As shown in FIG. 2, according to an embodiment, the phantom 140 can be a cross-rod phantom and have the shape of a box containing two phantom rods comprising, for example, Ge-68. Other appropriate radiating material can be used. The phantom rods 210, 220 may generate both, for example, about 2 mCi. According to an embodiment, as shown in FIG. 2, the two phantom rod sources 210, 220 are in at least one position neither parallel nor connected to each other.

Figure 11:
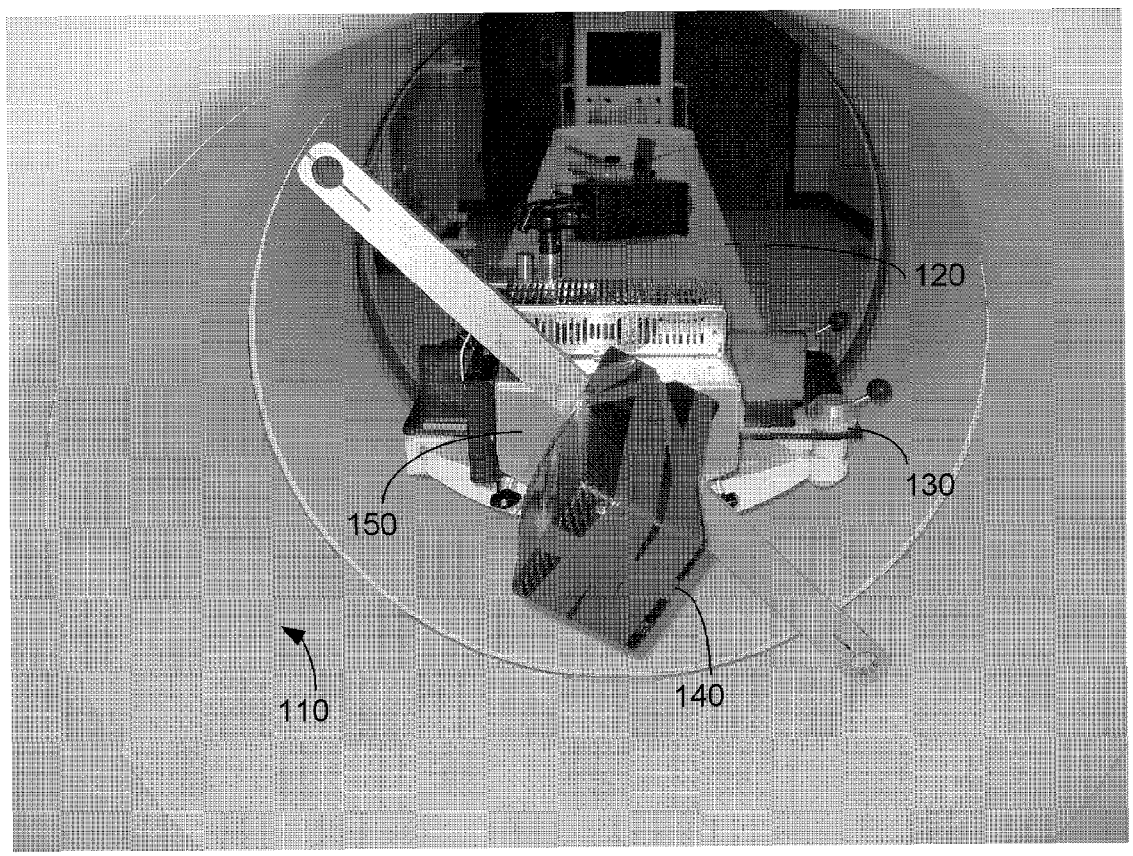
FIG. 11 shows a three dimensional picture of a prototype according to an embodiment.

A prototype arrangement with a phantom device taped to a rotatable wheel at the end of a patient table is shown in FIG. 11. This prototype arrangement has been used to confirm the following different setup/calibration tasks/procedures. For example, to perform the task of gantry offset between the PET scanner and the CT scanner, the cross rod phantom is scanned in the CT and PET FOV without rotation. CT volume images and PET volume images of these two rods are then reconstructed. Next, the lines of the minimal distance between these two rods in each volume are calculated. Then, the shift (and rotation) between these two minimal distance lines is calculated and used as the offset between PET and CT gantries.

In the task of gantry setup, the cross rod phantom again stays in the PET FOV without rotation. During the gantry setup, for each PET detector, the crystal energy peak, crystal position profile, and tube gain are adjusted. The PET scanner comprises a plurality, for example 36 detector blocks arranged within a ring. Single rates across all blocks are listed below as generated in an exemplary test using the phantom according to an embodiment. In a successful calibration the return rate is very uniform among all blocks.

TABLE 1 block = 0, singles rate := 131844
block = 1, singles rate := 133500
block = 2, singles rate := 133240
block = 3, singles rate := 133200
block = 4, singles rate := 133688
block = 5, singles rate := 134244
block = 6, singles rate := 136616
block = 7, singles rate := 137616
block = 8, singles rate := 138484
block = 9, singles rate := 137584
block = 10, singles rate := 135268
block = 11, singles rate := 133860
block = 12, singles rate := 134320
block = 13, singles rate := 133948
block = 14, singles rate := 133916
block = 15, singles rate := 133896
block = 16, singles rate := 135400
block = 17, singles rate := 136476
block = 18, singles rate := 138428
block = 19, singles rate := 141176
block = 20, singles rate := 141756
block = 21, singles rate := 140852
block = 22, singles rate := 138740
block = 23, singles rate := 136264
block = 24, singles rate := 131896
block = 25, singles rate := 131372
block = 26, singles rate := 131400
block = 27, singles rate := 132336
block = 28, singles rate := 132816
block = 29, singles rate := 134840
block = 30, singles rate := 136468
block = 31, singles rate := 139212
block = 32, singles rate := 139468
block = 33, singles rate := 138636
block = 34, singles rate := 137280
block = 35, singles rate := 134200

Figure 3:
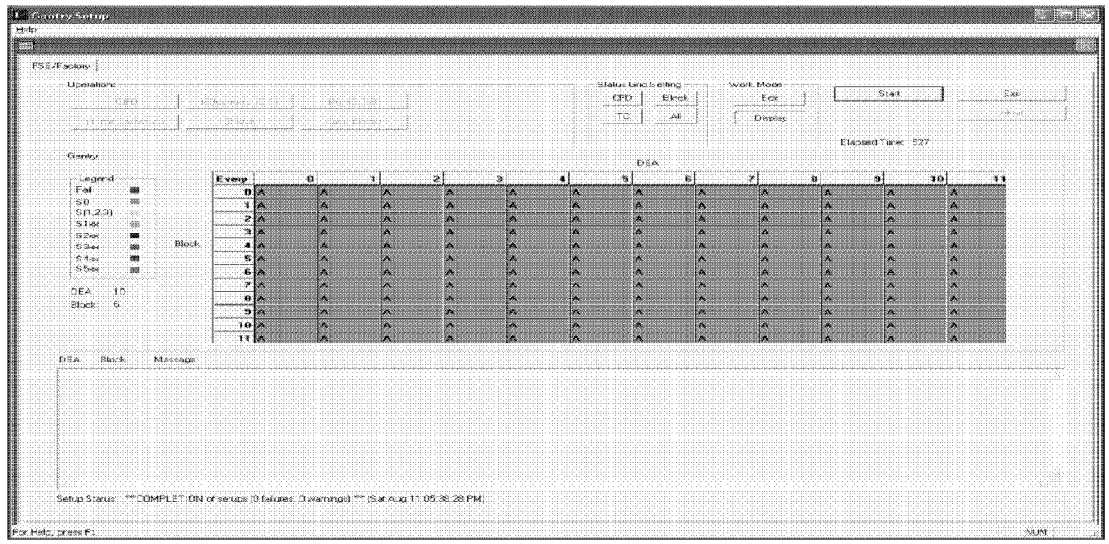
FIG. 3 shows a gantry setup protocol.
Figure 5:
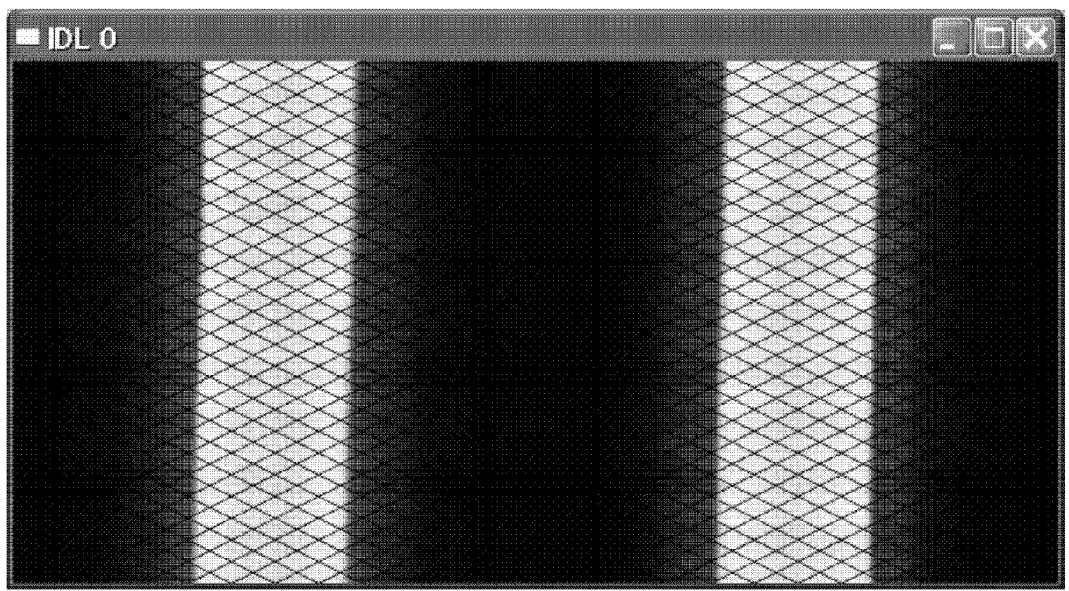
FIG. 5 shows a uniform phantom sonogram.

FIG. 3 shows an exemplary screen shot depicting a routine gantry setup protocol finished successfully with such a setup. The PET gantry consists of 12 detector electronic assemblies (DEA). Each DEA controls 12 detector blocks. FIG. 3 shows a table of these DEA and indicates that every block passed the gantry setup. In the task of gantry setup, the cross rod phantom then stayed in the PET FOV with rotation to create a "uniform cylinder shell" source. As will be explained in more detail below, depending on the arrangement of the two rods the shape of the shell varies. Each rod 210, 220 generates a uniform shell depending on the position of the rod with respect to the rotation axis. For example, rod 220 would create the shape of an hour glass. Rod 210 would create a less tapered hour glass shape. In case one of the rods is in parallel with the rotation axis, as will be explained below according to another embodiment, a cylinder shape is created. The rotation, thus, creates uniform shapes of the two rods which are overlaid to create the final uniform shell when the phantom is rotated. A respective uniform phantom sonogram of this rotated phantom is for example shown in FIG. 5. In the example of FIG. 5 a good quality sonogram of validates the gantry setup.

Figure 4:
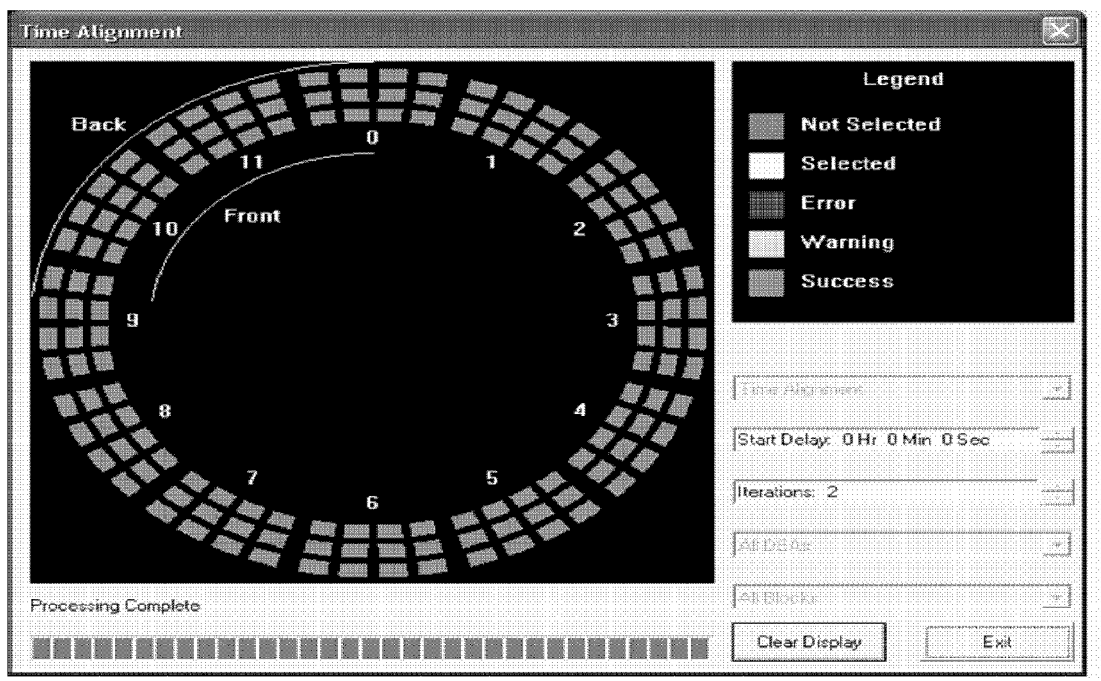
FIG. 4 shows a time alignment protocol.

For time alignment calibration, the phantom is again rotated within the FOV of the PET scanner. In this calibration routine, a coincidence event is determined by two events happening in the coincidence time window. Synchronization of all detector electronics is very important. Thus, the time alignment is used to synchronize the detectors to make sure they have the same time delay. FIG. 4 displays the 3 rings of 48 PET blocks and shows an example of a graphical user interface for the routine time alignment protocol after a successful setup. Again, as shown in FIG. 5, a uniform phantom sinogram with good quality can be acquired after such a setup which validates this time alignment. To this end, FIG. 5 shows two slices of a uniform phantom sinogram (with $1.2 \cdot 10^{10}$ trues) acquired after gantry setup and time alignment.

As a following calibration step, normalization of the PET scanner is performed. For this calibration task, the cross rod phantom again stayed in the PET FOV with rotation. Sinograms are then acquired with a total number of true events of $1 \cdot 10^8$, $2 \cdot 10^8$, $3 \cdot 10^8$, and $4 \cdot 10^8$. Normalization may then be created with each of the 4 sinograms. A uniform phantom with $1 \cdot 10^8$ counts (current standard normalization protocol) is acquired for comparison with the cross rods normalization. A nearly noise free (with $1.2 \cdot 10^{10}$ trues) uniform phantom sinogram can be acquired to test these normalizations.

Figure 6:
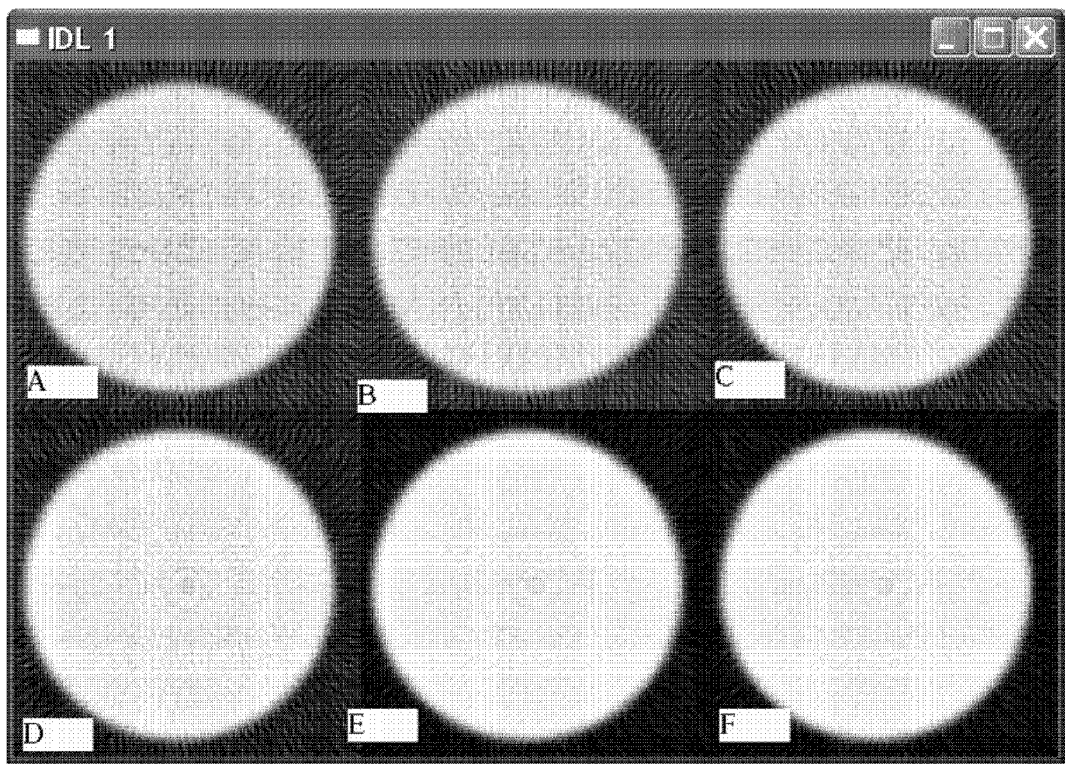
FIG. 6 shows a variety of reconstructed images using the phantom and apparatus according to an embodiment and according to conventional technique.

FIG. 6 shows the reconstructed images of the nearly noise free uniform phantom with different normalizations. Image A-D are reconstructed images with increasing count level using the rotated cross rod phantom according to an embodiment, whereas images E and F show examples of images produced by a conventional uniform phantom. Image A uses a count level of $1 \cdot 10^8$, image B a count level of $2 \cdot 10^8$, image C a count level of $3 \cdot 10^8$, and image D a count level of $4 \cdot 10^8$. The count levels for the conventional uniform phantom in image E are $1 \cdot 10^8$, and in image F $1.2 \cdot 10^{10}$. It is to be noted, that the scans are extremely long scans (6 times longer than the NEMA 1994 uniformity test), thus small image imperfection such as ring artifact shows up. It can be seen from the images with increasing count level for the cross rod phantom acquisition, there is less noise in the reconstructed image. The two images reconstructed with uniform phantom norm have less noise than the cross rod phantoms.

The reason for the higher noise associated with cross rod normalization is in the process of computing fan-sums as crystal efficiency, multiple lines of response (LOR) were added together. The larger the number of LORs to be added, the higher noise reduction it can to achieve in computing crystal efficiency. Therefore, according to an embodiment, one solution is to increase the distance between the two rods. According to another embodiment, the acquisition time for the phantom having cross rods can be increased. With the sources in this study, $1 \cdot 10^8$ counts only take 3.6 minutes.

Figure 7:
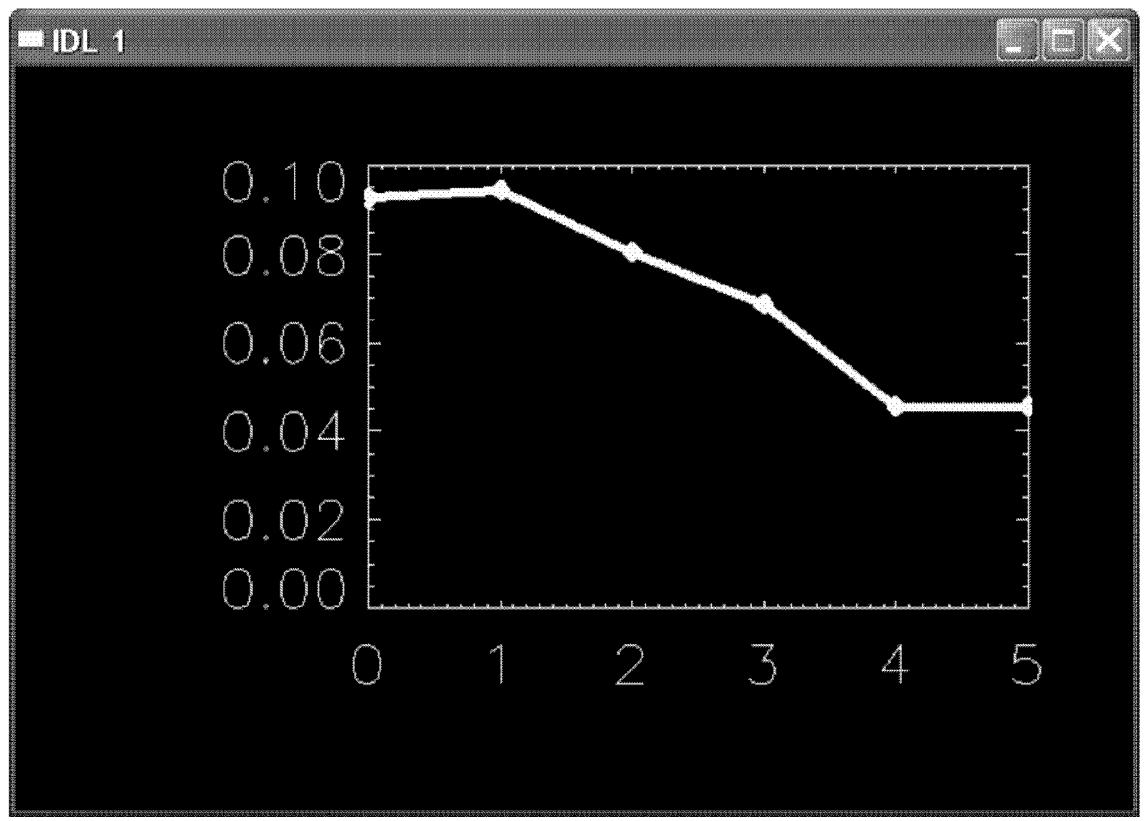
FIG. 7 shows statistical deviation depending on different embodiments.

FIG. 7 shows relative standard deviations in the center square region of interest (ROI). These ROI can be for example encompass an area of 30×30 pixels and are computed as plotted for all reconstructed images in FIG. 7. Data points from left to right show: 0: cross rods $1 \cdot 10^8$; 1: cross rods $2 \cdot 10^8$; 2: cross rods $3 \cdot 10^8$; 3: cross rods $4 \cdot 10^8$; 4: conventional uniform $1 \cdot 10^8$; 5: conventional uniform $1.2 \cdot 10^9$. From FIG. 7, it can be seen with increasing count level in cross rods phantom norm, the image noise is still decreasing from $2 \cdot 10^8$ to $4 \cdot 10^8$ (Numbers 1 to 3). With 5e8 or 6e8 it could achieve the noise level as the uniform phantom 1e8 level (Numbers 4 and 5).

Moreover, a chi-square ($\chi^2$) test was run on crystal efficiencies computed from different sinograms vs. computed from the $1.2 \cdot 10^9$ uniform sinogram. The results showed that there was no systematic difference between the crystal efficiencies computed from different the sinograms.

Next, for the task of quality check, the same setup as used for normalization can also be used as a quality check setup. The PET quality check is performed by checking the total detector efficiency, crystal efficiency noise.

Figure 9:
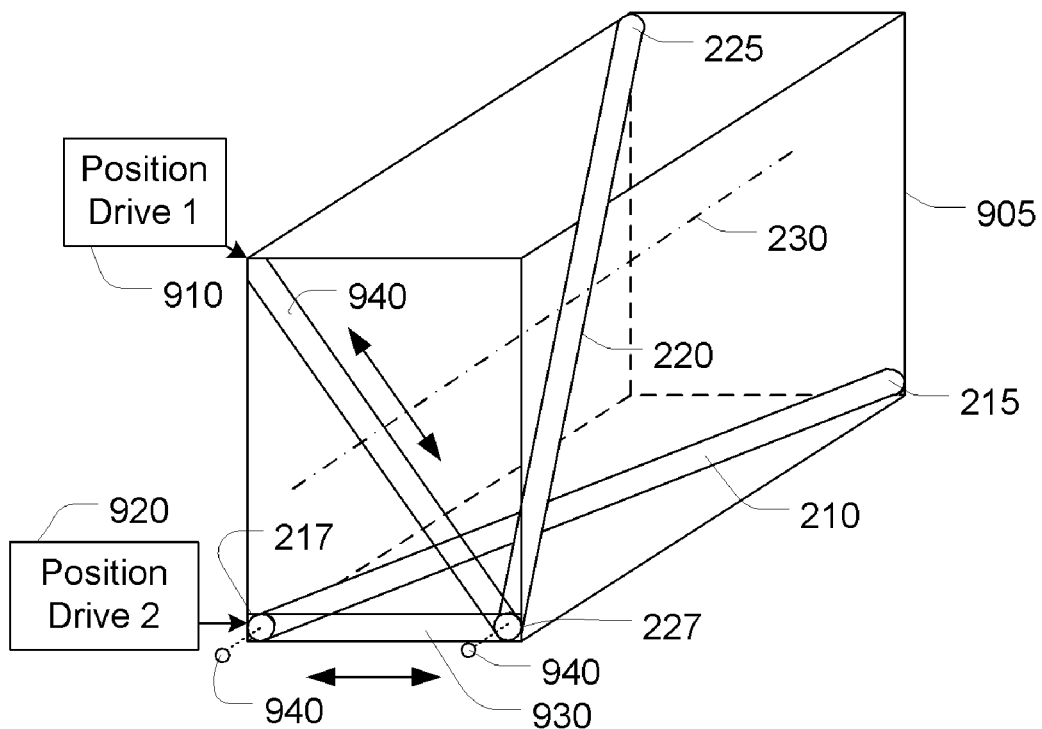
FIGS. 9 and 10 show yet another embodiment of a phantom device with different adjustable positions of the phantom rods.
Figure 10:
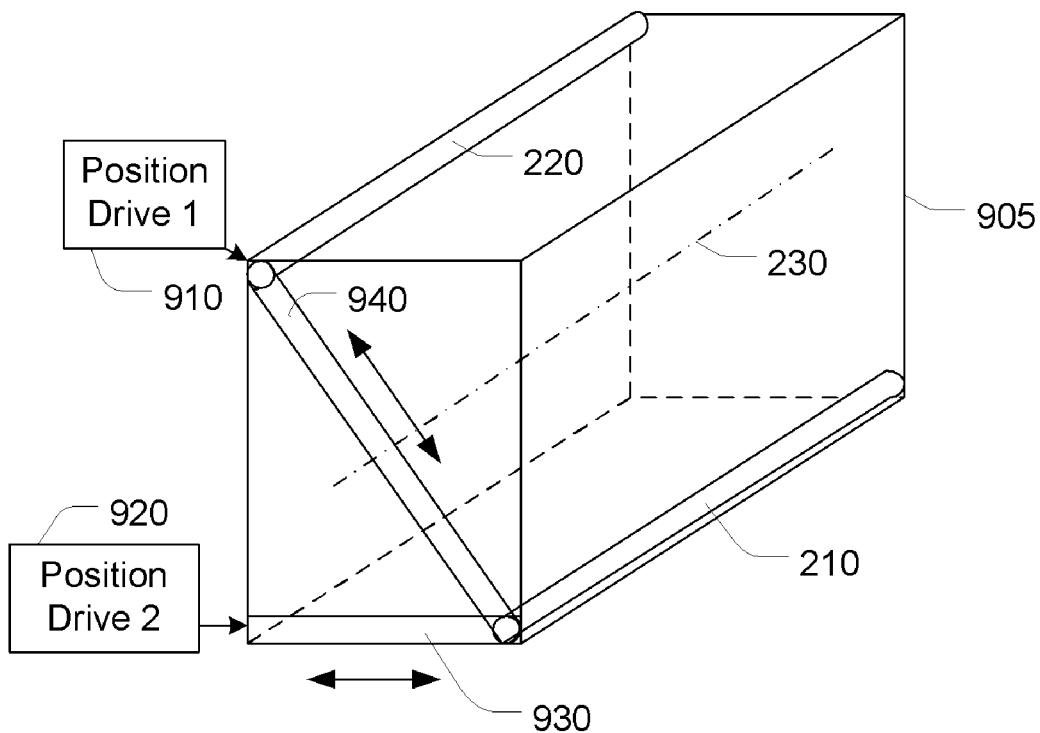

According to another embodiment, the phantom could have also 2 rods which can be turned into several angles, e.g., a parallel position for normalization and quality check, and a cross position for offset. FIGS. 9 and 10 show an embodiment of a phantom 900 that allows for different positions of the rods within the phantom housing. As shown in FIG. 9, the phantom housing 905 comprises the two rods 210 and 220 wherein each rod has an end 215; and 225 which is held in a fixed position and an end 217; 227 which can be moved from a first into a second position. In the first position, the rods 210, 220 are positioned as shown in FIG. 2. However, the housing may comprise respective position drives 910 and 920 for each drive to provide for different positions of rods 210, 220 within the housing. According to an embodiment, the housing may comprise guide rails 930 and 940 along which the moveable end of rods 210 and 220 can be moved. Thus, as shown in FIG. 10, rods 210 and 220 can be moved into a second position in which both rods are in parallel. In this position, when rotating housing 905 around rotation axis 230, the rods will appear to the system as a uniform cylinder.

Housing 905 can be rotated around axis 230 by a respective motor 150 as shown for example in FIG. 1. Thus, the position drives 910, 920 can be arranged within the housing or, according to another embodiment, housing 905 may comprise a mechanism for positioning the rods 210, 220 which is driven by another motor driving another shaft, for example a hollow shaft arranged along the rotation axis 230. According to yet another embodiment, housing 905 may comprise shifting levers 940 (indicated by dotted lines in FIGS. 9 and 10) for manually shifting rods 210, 220 into the first or second position. To this end, for easier handling, the shifting handles could be arranged on the opposite side of the motor shaft coupling. The variable positioning of rods 210, 220 allows for an optimal shape of the phantom for each calibration task when static or rotated.

Figure 8:
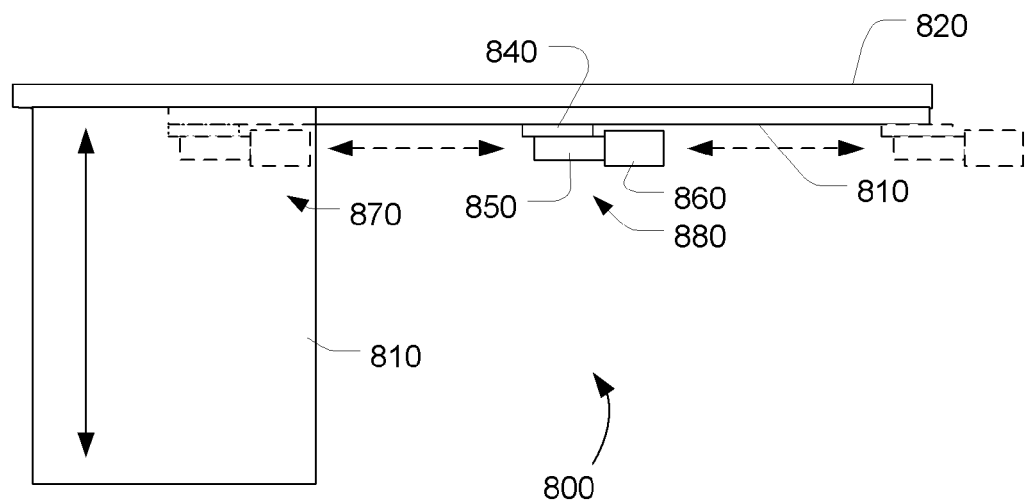
FIG. 8 shows an embodiment of a calibration apparatus attached to a patient table.

In summary, the device according to different embodiments can be a stand-alone rotating phantom to be mounted at the end of the bed, or it could be permanently attached to the bed. FIG. 8 shows an embodiment comprising a cantilevered patient table 820 supported by a lifting mechanism 810. The table 810 may have a rail system 830 attached to the bottom of the table. The rail system 830 supports a calibration device 880 moveable along the horizontal rail 830. The calibration device 880 comprises a carrying device 840 coupled with a support unit 850 comprising a rotation motor with a driven shaft to which the phantom 860 can be attached. The phantom 860 can be either permanently or removable attached to the motor shaft. The lifting mechanism 810 may have a shielded storage space 870. Thus, the calibration device 880 can be stored away in the storage space 870 when not in use and moved into a calibration position as shown by the dotted lines in FIG. 8. Thus, a fully automatic gantry offset, gantry setup, time alignment, normalization and QC is possible with this design. This allows for minimal contact and exposure of a technician during setup and/or calibration of the PET/CT system.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A calibration system for a combined Positron Emission Tomography (PET)/Computed Tomography scanner system, comprising a support structure carrying a rotation motor driving a phantom, wherein the phantom comprises at least two phantom rods, wherein the rods are positioned such that they are neither parallel nor connected to each other.

2. The calibration system according to claim 1, further comprising a moving mechanism operable to move the rods from a first position in which the rods are positioned neither parallel nor connected to each other to a second position different from the first position.

3. The calibration system according to claim 2, wherein the moving mechanism is operated manually.

4. The calibration system according to claim 2, wherein the moving mechanism is driven by at least one positioning motor.

5. The calibration system according to claim 1, wherein the support structure is movably mounted on a patient table of the combined Positron Emission Tomography (PET)/Computed Tomography scanner system.

6. The calibration system according to claim 5 wherein the patient table comprises a rail attached to the bottom of the table along which the support structure can be moved.

7. The calibration system according to claim 6 wherein the patient table is cantilevered from a lift unit which comprises a storage compartment for receiving the support structure when moved into a storage position.

8. The calibration system according to claim 7, wherein the storage compartment is shielded.

9. The calibration system according to claim 1, wherein the phantom is removable from said rotation motor.

10. The calibration system according to claim 1, wherein the phantom comprises two rods comprising Ge-68.

11. A method for calibrating a combined Positron Emission Tomography (PET)/Computed Tomography scanner system, the method comprising the steps of:

providing a single phantom for performing a plurality of calibration tasks;

wherein the single phantom is moved into a gantry of the combined Positron Emission Tomography (PET)/Computed Tomography scanner system and held into a static position during at least one of the plurality of calibration tasks;

wherein the single phantom is rotated along a horizontal axis within said gantry during at least another one of the plurality of calibration tasks; and wherein the phantom comprises two rods that are positioned for at least one of the plurality of calibration tasks such that they are neither parallel nor connected to each other.

12. The method according to claim 11, wherein the plurality of calibration tasks comprises a gantry offset determination task, a gantry setup task, a time alignment task, a normalization task, and a quality check task.

13. The method according to claim 12, wherein the phantom is rotated during the gantry setup, the time alignment task, the normalization task, and the quality check task.

14. The method according to claim 12, wherein the rods are moved from a first position into a second position between two sequential calibrations tasks.

15. The method according to claim 14, wherein in the first position the two rods are neither parallel nor connected to each other and in the second position the two rods are in parallel.

16. The method according to claim 14, further comprising the step of moving the rods manually from a first position into a second position.

17. The method according to claim 14, further comprising the step of moving the rods automatically from a first position into a second position.

18. A combined Positron Emission Tomography (PET)/Computed Tomography scanner system, comprising:

a vertically movable patient table comprising a rail along which a support structure can be moved, wherein the support structure carries a rotation motor driving a phantom, wherein the phantom comprises at least two phantom rods, wherein the rods are positioned such that they are neither parallel nor connected to each other.

19. The system according to claim 18, further comprising a moving mechanism operable to move the rods from a first position in which the rods are positioned neither parallel nor connected to each other to a second position different from the first position.

20. The system according to claim 18, wherein the patient table is cantilevered from a lift unit which comprises a storage compartment for receiving the support structure when moved into a storage position.

21. The system according to claim 20, wherein the storage compartment is shielded.

22. The system according to claim 18, wherein the phantom is removable from said rotation motor.

* * * * *